(12) United States Patent
Benjamin et al.

(10) Patent No.: US 12,280,583 B2
(45) Date of Patent: Apr. 22, 2025

(54) GLASS ARTICLES HAVING ADHESIVE BEAD WITH HIGH ASPECT RATIO AND METHOD OF PREPARING SAME

(71) Applicant: Corning Incorporated, Corning, NY (US)

(72) Inventors: Jeffrey Michael Benjamin, Horseheads, NY (US); Jennifer Hiras, Corning, NY (US); Robert Daniel Parker, Beaver Dams, NY (US); Christopher Lee Timmons, Big Flats, NY (US)

(73) Assignee: CORNING INCORPORATED, Corning, NY (US)

( * ) Notice: Subject to any disclaimer, the term of this patent is extended or adjusted under 35 U.S.C. 154(b) by 0 days.

(21) Appl. No.: 18/009,563

(22) PCT Filed: Jun. 8, 2021

(86) PCT No.: PCT/US2021/036307
§ 371 (c)(1),
(2) Date: Dec. 9, 2022

(87) PCT Pub. No.: WO2021/252430
PCT Pub. Date: Dec. 16, 2021

(65) Prior Publication Data
US 2023/0212070 A1    Jul. 6, 2023

Related U.S. Application Data

(60) Provisional application No. 63/037,864, filed on Jun. 11, 2020.

(51) Int. Cl.
*B32B 7/14* (2006.01)
*B32B 17/06* (2006.01)

(52) U.S. Cl.
CPC .............. *B32B 7/14* (2013.01); *B32B 17/06* (2013.01); *B32B 2315/08* (2013.01)

(58) Field of Classification Search
CPC ........ B32B 7/14; B32B 17/06; B32B 2315/08
(Continued)

(56) References Cited

U.S. PATENT DOCUMENTS

| 2006/0270807 A1* | 11/2006 | Zhu ...................... C09J 175/04 525/453 |
| 2023/0212070 A1* | 7/2023 | Benjamin ............... C03B 23/03 428/194 |

FOREIGN PATENT DOCUMENTS

| JP | 2013-188993 A | 9/2013 |
| WO | 2020/092060 A1 | 5/2020 |
| WO | 2020/112430 A1 | 6/2020 |

OTHER PUBLICATIONS

International Search Report and Written Opinion of the International Searching Authority; PCT/US2021/036307; dated Oct. 4, 2021; 11 pages; European Patent Office.

\* cited by examiner

*Primary Examiner* — Betelhem Shewareged
(74) *Attorney, Agent, or Firm* — Daniel J. Greenhalgh

(57) ABSTRACT

A glass article including a frame having a frame support surface, a glass sheet having a first major surface and a second major surface in which the second major surface is opposite to the first major surface, and an adhesive bead disposed between the frame support surface and the second major surface. The adhesive bead defines a bead path. The adhesive bead has a cross-section perpendicular to the bead path, and the cross-section includes a width and a height. The height is a maximum dimension perpendicular to the second major surface of the glass sheet, and the width is a maximum dimension parallel to the second major surface of (Continued)

the glass sheet. An aspect ratio of the height to the width is at least 0.6, and the width is 2 mm or less.

5 Claims, 5 Drawing Sheets

(58) Field of Classification Search
USPC .......................................................... 428/194
See application file for complete search history.

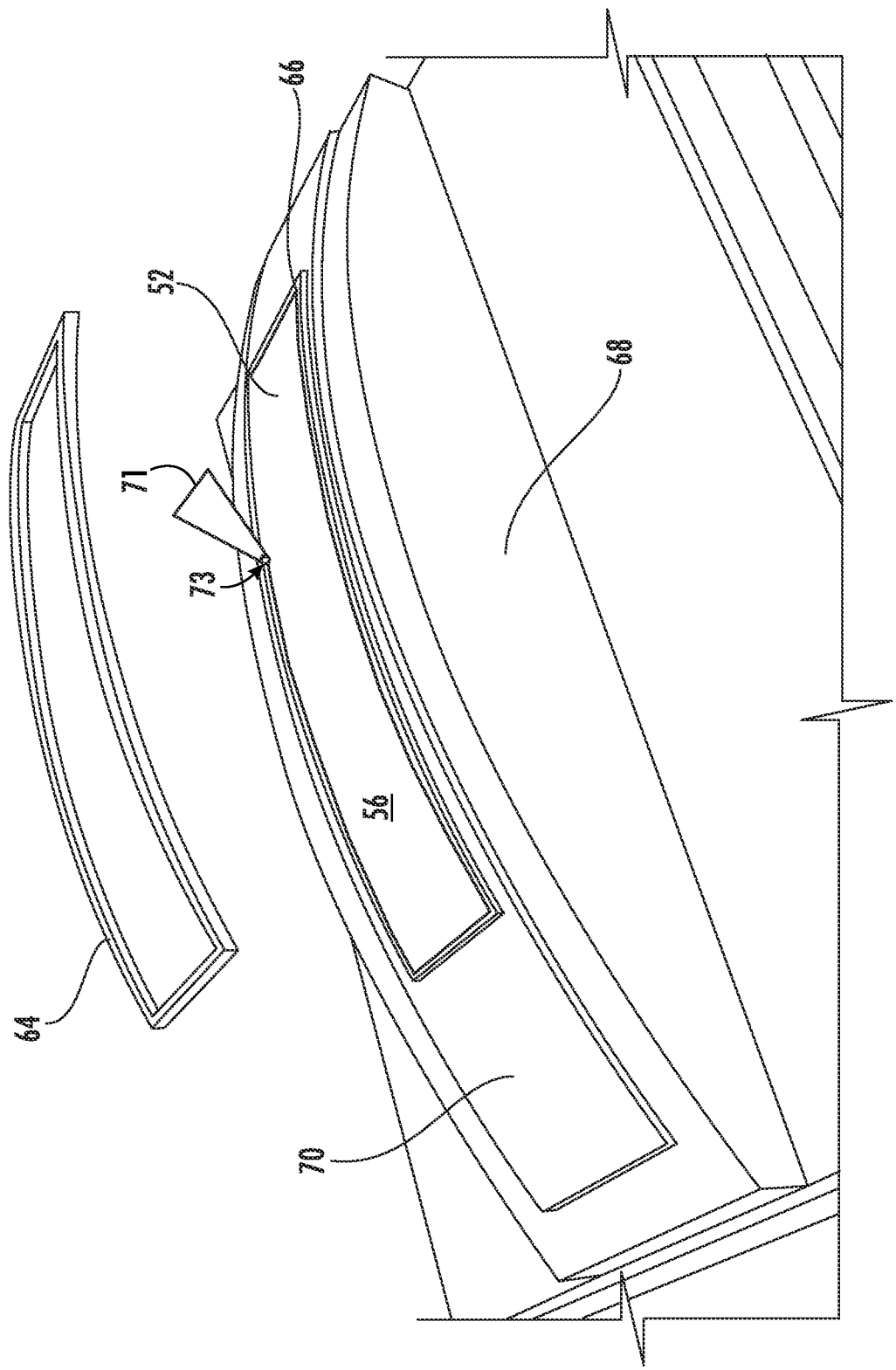

As-dispensed (uncompressed)

Compressed height to 0.8mm

GLASS ARTICLES HAVING ADHESIVE BEAD WITH HIGH ASPECT RATIO AND METHOD OF PREPARING SAME

CROSS-REFERENCE TO RELATED APPLICATIONS

This application claims the benefit of priority under 35 U.S.C. § 371 of International Application No. PCT/US2021/036307, filed on Jun. 8, 2021, which claims the benefit of priority under 35 U.S.C. § 119 of U.S. Provisional Application Ser. No. 63/037,864 filed on Jun. 11, 2020, the content of which is relied upon and incorporated herein by reference in its entirety.

BACKGROUND

The disclosure relates to glass articles for vehicle interior systems, in particular to a glass article having an adhesive bead with a high aspect ratio of height to width of at least 0.6 and to a method of producing same.

Vehicle interiors may incorporate glass surfaces as part of the aesthetic and functional design of the vehicle. Such glass surfaces may be bonded to a frame system that attaches the glass surface to the vehicle interior. Typically, the frame and glass surface are made of different materials having different thermal expansion properties. Accordingly, thermal stresses may develop during thermal cycling between hot and cold temperature extremes. Such thermal stresses may be so great as to cause failure of the bond holding the glass surface to the frame system, especially when the glass surface is cold-formed and bonded to the frame system.

SUMMARY

According to an aspect, embodiments of the disclosure relate to a glass article including a frame having a frame support surface, a glass sheet having a first major surface and a second major surface in which the second major surface is opposite to the first major surface, and an adhesive bead disposed between the frame support surface and the second major surface. The adhesive bead defines a bead path. The adhesive bead has a cross-section perpendicular to the bead path, and the cross-section includes a width and a height. The height is a maximum dimension perpendicular to the second major surface of the glass sheet, and the width is a maximum dimension parallel to the second major surface of the glass sheet. An aspect ratio of the height to the width is at least 0.6, and the width is 2 mm or less.

According to another aspect, embodiments of the disclosure relate to a method of forming a glass article. The glass article includes a glass sheet having a first major surface and a second major surface in which the second major surface is opposite to the first major surface. The glass article also includes a frame adhered to the glass sheet. In the method, an adhesive bead is applied in a bead path onto the second major surface of a glass sheet or onto a frame support surface of the frame. The adhesive bead has a first height perpendicular to the second major surface or to the frame support surface to which the adhesive bead is applied and a first width in which the first width and the first height are perpendicular to the bead path. The adhesive bead is compressed between the second major surface of the glass sheet and the frame support surface to a second height and a second width. The adhesive bead is expanded to a third height and a third width. The third height is greater than the second height, and an aspect ratio of third height to the third width is at least 0.6.

According to still another aspect, embodiments of the disclosure relate to a system for forming a glass article. The glass article includes a glass sheet adhered to a frame by an adhesive bead. The system includes a chuck having a curved forming surface over which the glass sheet is bent. The system also includes a press configured to position the frame over the glass sheet. Further, the system includes a nozzle configured to dispense the adhesive bead on the glass sheet. The press is configured to position the frame at a first height above the glass sheet to compress the adhesive bead, and the press is configured to reposition the frame at a second height above the glass sheet. The second height is greater than the first height.

Additional features and advantages will be set forth in the detailed description which follows, and in part will be readily apparent to those skilled in the art from that description or recognized by practicing the embodiments as described herein, including the detailed description which follows, the claims, as well as the appended drawings.

It is to be understood that both the foregoing general description and the following detailed description are merely exemplary, and are intended to provide an overview or framework to understanding the nature and character of the claims. The accompanying drawings are included to provide a further understanding, and are incorporated in and constitute a part of this specification.

BRIEF DESCRIPTION OF THE DRAWINGS

The accompanying drawings incorporated in and forming a part of the specification illustrate several aspects of the present invention and, together with the description, serve to explain the principles of the invention. In the drawings:

FIG. 3 depicts an embodiment of a cold-forming arrangement for producing glass articles, according to an exemplary embodiment;

DETAILED DESCRIPTION

Reference will now be made in detail to various embodiments, examples of which are illustrated in the accompanying drawings. Disclosed herein are curved glass articles for vehicle interior systems in which a frame is joined to a glass sheet using an adhesive bead having a high aspect ratio. In particular, the height of the adhesive bead perpendicular to the glass surface is at least 0.6 times the width of the adhesive bead parallel to the glass surface. Advantageously, such a high aspect ratio adhesive bead is better able handle stresses caused by thermal cycling while still providing a minimal foot print, which maximizes display area.

Also disclosed are embodiments of a method for manufacturing a glass article having a high aspect ratio adhesive bead. In the method, the frame compresses the adhesive bead beyond a desired final height, and then the frame is retracted to pull the adhesive bead back to the desired height. In this this way, the high aspect ratio is provided, and surface contact between the adhesive and glass and between the adhesive and frame is increased. Various embodiments of the glass article having the high aspect ratio adhesive bead and methods of manufacturing same are disclosed in relation to the exemplary embodiments provided below and depicted in the figures. These embodiments are provided by way of illustration and not by way of limitation.

Figure 1:
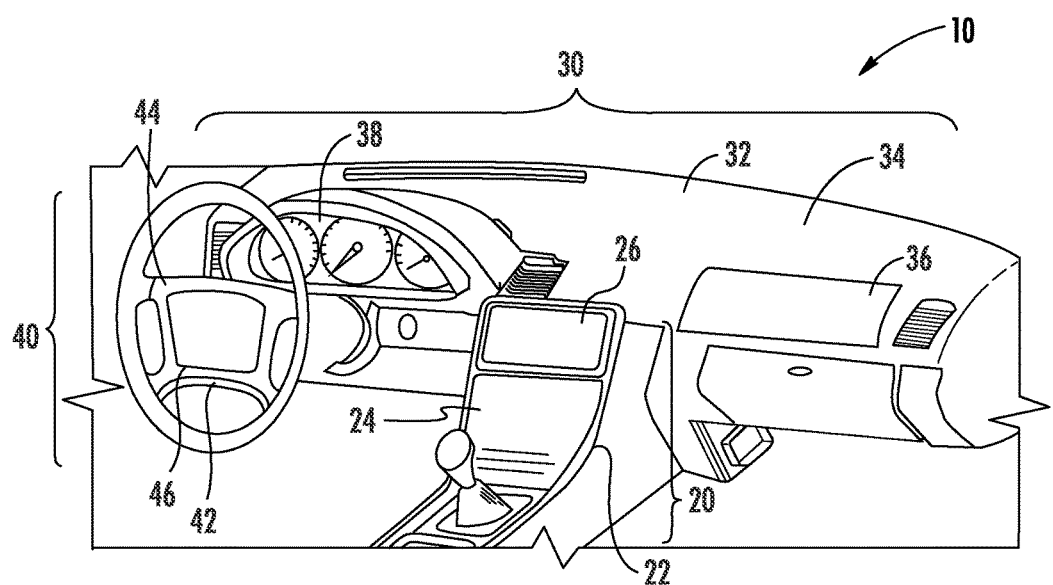
FIG. 1 is a perspective view of a vehicle interior having curved glass surfaces, according to an exemplary embodiment.

FIG. 1 shows an exemplary interior 10 of a vehicle that includes three different embodiments of vehicle interior systems 20, 30, 40. Vehicle interior system 20 includes a base, shown as center console base 22, with a curved surface 24 including a display 26. Vehicle interior system 30 includes a base, shown as dashboard base 32, with a curved surface 34 including a display 36. The dashboard base 32 typically includes an instrument panel 38 which may also include a display. Vehicle interior system 40 includes a base, shown as steering wheel base 42, with a curved surface 44 and a display 46. In one or more embodiments, the vehicle interior system includes a base that is an arm rest, a pillar, a seat back, a floor board, a headrest, a door panel, or any portion of the interior of a vehicle that includes a curved surface. In other embodiments, the base is a portion of a housing for a free-standing display (i.e., a display that is not permanently connected to a portion of the vehicle).

The embodiments of the curved glass articles described herein can be used in each of vehicle interior systems 20, 30, 40, among others. In some such embodiments, the glass article discussed herein may include a cover glass sheet that also covers non-display surfaces of the dashboard, center console, steering wheel, door panel, etc. In such embodiments, the glass material may be selected based on its weight, aesthetic appearance, etc. and may be provided with a coating (e.g., an ink or pigment coating) with a pattern (e.g., a brushed metal appearance, a wood grain appearance, a leather appearance, a colored appearance, etc.) to visually match the glass components with adjacent non-glass components. In specific embodiments, such ink or pigment coating may have a transparency level that provides for deadfront or color matching functionality when the display 26, 36, 38, 46 is inactive. Further, while the vehicle interior of FIG. 1 depicts a vehicle in the form of an automobile (e.g., cars, trucks, buses and the like), the glass articles disclosed herein can be incorporated into other vehicles, such as trains, sea craft (boats, ships, submarines, and the like), and aircraft (e.g., drones, airplanes, jets, helicopters and the like).

Figure 2A:
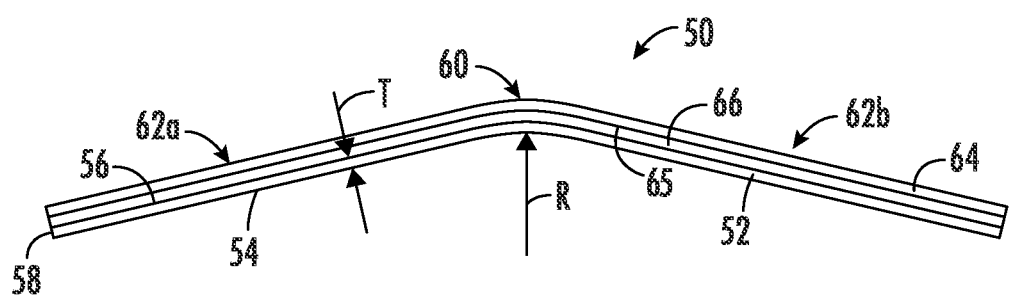
FIGS. 2A and 2B depict side views of embodiments of curved glass articles that may be used in the vehicle interior of FIG. 1, according to exemplary embodiments.
Figure 2B:
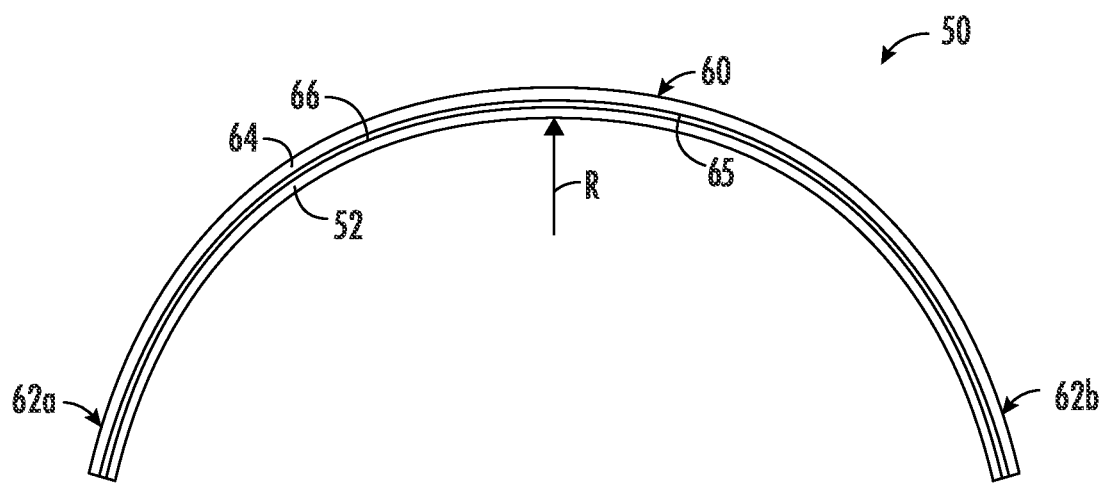

In embodiments, the curved surfaces 24, 34, 44 can be any of a variety of curved shaped, such as V-shaped or C-shaped as shown in FIGS. 2A and 2B, respectively. Referring first to FIG. 2A, a side view of an embodiment of a V-shaped glass article 50 is shown. The glass article 50 includes a glass sheet 52 having a first major surface 54, a second major surface 56 opposite to the first major surface 54, and a minor surface 58 joining the first major surface 54 to the second major surface 56. The first major surface 54 and the second major surface 56 define a thickness T of the glass sheet 52. In embodiments, the thickness T of the glass sheet 52 is from 0.3 mm to 2 mm, in particular 0.5 mm to 1.1 mm. In a vehicle, the first major surface 54 faces the occupants of the vehicle.

In embodiments, the first major surface 54 and/or the second major surface 56 includes one or more surface treatments. Examples of surface treatments that may be applied to one or both of the first major surface 54 and second major surface 56 include an anti-glare coating, an anti-reflective coating, a coating providing touch functionality, a decorative (e.g., ink or pigment) coating, and an easy-to-clean coating.

As can be seen in FIG. 2A, the glass sheet 52 has a curved region 60 disposed between a first flat section 62a and a second flat section 62b. In embodiments, the curved region 60 has a radius of curvature R that is from 75 mm to a radius of curvature that is less than substantially flat or planar (e.g., R=10 m). In particular, the curved region 60 has a radius of curvature R that is from 150 mm to 3000 mm. Further, as shown in FIG. 2A, the curved region 60 defines a concave curve with respect to the first major surface 54, but in other embodiments, the curved region 60 is instead a convex curve with respect to the first major surface 54.

In the glass article 50 of FIG. 2A, a frame 64 is adhered to the second major surface 56 of the glass sheet 52 using an adhesive bead 66. In embodiments, the adhesive bead 66 is a structural adhesive, such as a polyurethane adhesive. Other materials are also possible. In embodiments, the material of the adhesive bead 66 comprises an elastic modulus of from 0.1 MPa to 300 MPa. Further, in embodiments, the material of the adhesive bead 66 comprises a viscosity of 1 kcps to 500 kcps.

In part, the frame 64 facilitates mounting the glass article 50 to a vehicle interior base (such as center console base 22, dashboard base 32, and/or steering wheel base 42 as shown in FIG. 1). Additionally, the frame 64 has a curved frame support surface 65 that holds the glass sheet 52 in its curved shape (at least in the curved region 60). In embodiments, the glass sheet 52 is formed in such a way that the curved region 60 is not permanent. That is, the glass sheet 52 would spring back to a planar, non-curved configuration if the glass sheet 52 was not adhered to the frame 64 using the adhesive bead 66. Thus, the glass sheet 52 is stressed to produce the curvature and remains stressed during the life of the glass article 50.

The stress in the glass sheet 52 tends to cause the glass sheet 52 to pull away from the frame 64, which means that the adhesive bead 66 is also stressed. This stress can be further exacerbated by stresses caused by thermal cycling. In particular, the glass sheet 52 has a different coefficient of thermal expansion than that of the frame 64, which is typically a metal, composite, or plastic component. The difference in coefficients of thermal expansion mean that the glass sheet 52 and frame expand or contract different amounts during thermal cycling between temperature extremes (e.g., as low as −40° C. and as high as 80° C.), causing additional stress in the adhesive bead 66. In order to avoid failure resulting from thermal stresses added to the normal mechanical stresses associated with bending, the adhesive bead 66 is provided with a high aspect ratio of height to width of at least 0.6. In conventional glass articles, the aspect ratio of the adhesive bead is 0.5 or less. Providing a thicker adhesive bead 66 (i.e., an adhesive bead having a relative high aspect ratio) reduces the stress developed in the adhesive bead 66 during thermal cycling because the shear stresses associated with differential thermal expansion are distributed over the thicker adhesive bead 66. Advantageously, the reduction in stress experienced by the adhesive bead 66 allows for a wider range of materials to be used for fabrication and for larger part designs.

While the mechanical and thermal stresses can be accounted for by provided a larger adhesive bead, aesthetic considerations limit how wide the adhesive bead can be. In particular, it is desired to minimize the area of the adhesive bead 66 in contact with the glass sheet 52 in order to maximize a display area of the glass article 50.

FIG. 2B depicts another embodiment of a glass article 50, in particular a C-shaped glass article 50. As compared to the V-shaped glass article 50 of FIG. 2A, the C-shaped glass article 50 of FIG. 2B has a larger curved region 60 and shorter flat sections 62a, 62b. The V-shape and C-shape are but two examples of curved glass articles 50 that can be created according to the present disclosure. In other embodiments, the glass articles 50 can include curved regions 60 having opposing curvatures to create an S-shape, a curved region 60 followed by a flat section 62a to create a J-shape, and curved regions 60 separated by a flat section 62a to create a U-shape, among others.

The glass articles 50 according to the present disclosure are formed by cold-forming techniques. In general, the process of cold-forming involves application of a bending force to the glass sheet 52 while the glass sheet 52 is situated on a chuck 68 as shown in FIG. 3. As can be seen, the chuck 68 has a curved forming surface 70, and the glass sheet 52 is bent into conformity with the curved forming surface 70. Advantageously, it is easier to apply surface treatments to a flat glass sheet 52 prior to creating the curvature in the glass sheet 52, and cold-forming allows the treated glass sheet 52 to be bent without destroying the surface treatment (as compared to the tendency of high temperatures associated with hot-forming techniques to destroy surface treatments, which requires surface treatments to be applied to the curved article in a more complicated process). In embodiments, the cold forming process is performed at a temperature less than the glass transition temperature of the glass sheet 52. In particular, the cold forming process may be performed at room temperature (e.g., about 20° C.) or a slightly elevated temperature, e.g., at 200° C. or less, 150° C. or less, 100° C. or less, or at 50° C. or less.

In embodiments, the bending force applied to the glass sheet 52 may be in the form of vacuum pressure pulled through the chuck 68. In embodiments, the chuck 68 includes interior channels having ports on the forming surface 70 of the chuck 68. When the glass sheet 52 is situated on the forming surface 70, vacuum is pulled through the channels to hold the glass sheet 52 against the chuck and into conformity with the curvature of the forming surface 70. In other embodiments, the forming surface 70 may hold the glass sheet 52 into compliance with the curvature using other techniques. For example, the forming surface 70 may be a self-adhesive material configured to provide sufficient adhesion to hold the glass sheet 52 in the curved configuration during cold forming, or the chuck 68 may operate in conjunction with a press or clamps that hold the glass sheet 52 into conformity with the forming surface 70 during cold-forming.

In the embodiment shown in FIG. 3, the adhesive bead 66 is applied to the second major surface 56 of the glass sheet 52, and the frame 64 is lowered onto the glass sheet 52. However, in other embodiments, the adhesive bead 66 could instead be applied to the frame support surface 65 of the frame 64. In either case, the frame 64 will compress the adhesive bead 66 between the frame support surface 65 and the second major surface 56 of the glass sheet 52 to the desired aspect ratio. As can be seen in FIG. 3, the adhesive bead 66 is being applied to the glass sheet 52 in such a manner that the shape traced by the adhesive bead 66, i.e., the "bead path," substantially matches the shape of the frame 64. In embodiments, the adhesive bead 66 defines a closed bead path such that the adhesive bead 66 is continuous on the glass sheet 52. In other embodiments, the adhesive bead 66 may have a discontinuous bead path, e.g., have breaks between sections of adhesive bead 66.

In embodiments, the adhesive bead 66 is applied via a nozzle 71 having a circular port 73 as shown in FIG. 3. Advantageously, such nozzles allow for ease of manufacturing because the orientation of the nozzle relative to the glass sheet 52 is not limited in comparison to certain nozzles having, e.g., triangular shaped ports, which much be aligned in a specific orientation with respect to a glass sheet in order to apply a shaped adhesive bead in the proper position.

Further, while FIG. 3 depicts the adhesive bead 66 being applied to the glass sheet 52 when the glass sheet 52 is in a curved configuration over the chuck 68, the adhesive bead 66 could instead be applied to the glass sheet 52 when the glass sheet 52 is in a flat configuration such that the glass sheet 52 having the adhesive bead 66 applied thereto is subsequently bent over the forming surface 70 of the chuck 68.

Figure 4A:
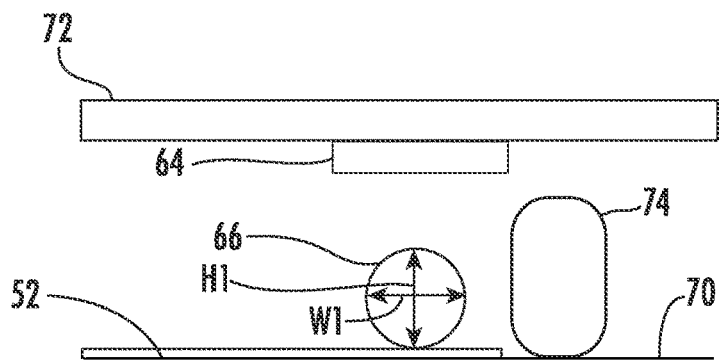
FIGS. 4A-4D schematically depict steps of a process for compressing an adhesive bead and positioning a frame over a glass sheet during cold-forming, according to an exemplary embodiment.

FIGS. 4A-4D depict steps in the process of achieving the desired aspect ratio of the adhesive bead 66 when bonding the frame 64 to the glass sheet 52. In FIGS. 4A-4D, only a portion of the glass sheet 52 and frame 64 are shown, in particular only a portion of the glass sheet 52 and the frame 64 where one particular cross-section of the adhesive bead 66 along the bead path is adhered to the glass sheet 52 and to the frame 64. With reference to FIG. 4A, the adhesive bead 66 has a cross-section that is perpendicular to the bead path. In embodiments, the cross-section of the adhesive bead 66 is substantially circular. In practice, the portion of the adhesive bead 66 in contact with the glass sheet 52 will likely be flattened, but the overall cross-sectional shape of the adhesive bead 66 is otherwise substantially circular.

As shown in FIG. 4A, the adhesive bead 66 has a first height H1 that is the dimension of the cross-section of adhesive bead 66 perpendicular to the glass sheet 52. Further, the adhesive bead 66 has a first width W1 that is the dimension of the cross-section of the adhesive bead parallel to the glass sheet 52.

Figure 4B:
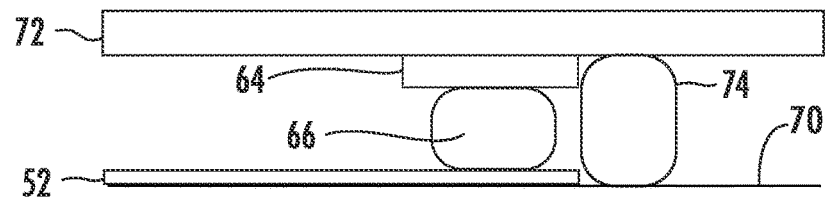
Figure 4C:
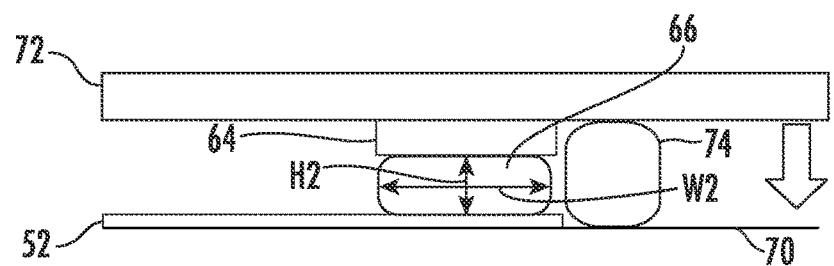

As shown in FIG. 4B, the frame 64 is lowered by a press 72 towards the glass sheet 52 thereby compressing the adhesive bead 66. In doing so, the cross-section of the adhesive bead 66 begins to change from circular to a rounded or bulging rectangle. According to the present disclosure, the adhesive bead 66 is compressed past a desired height by 10% to 50%, and then the frame 64 is retracted to pull the adhesive bead 66 backup to the desired height. Thus, as shown in FIG. 4C, the frame 64 is moved towards the glass sheet 52 until the adhesive bead reaches a second height H2 and a second width W2. In embodiments, the second height H2 is half the first height H1 or less (i.e., H2≤0.5*H1). In embodiments, the adhesive bead 66 is allowed to partially cure while at the second height H2.

Figure 4D:
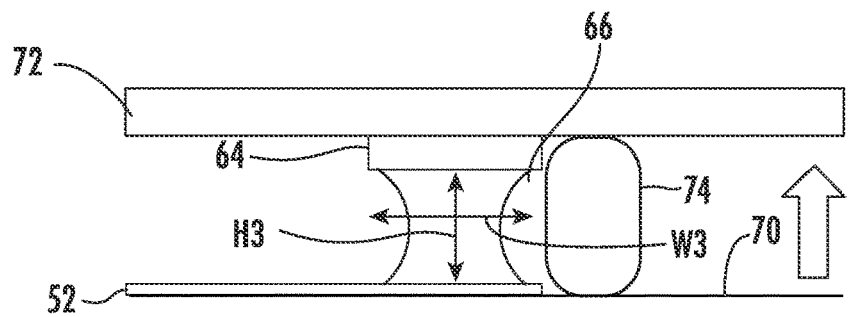

As can be seen in FIG. 4D, the press 72 then retracts the frame 64 until the adhesive bead 66 reaches a third height H3 and a third width W3. In embodiments, the third height H3 is greater than the second height H2 (i.e., H3>H2). In particular embodiments, the second height H2 is 50% to 90% of the third height H3 (i.e., 0.5*H3≤H2≤0.9*H3). Further, the third height H3 and the third width W3 are intended to be the final, cured dimensions of the adhesive bead 66. The aspect ratio of the third height H3 to the third width W3 is at least 0.6 (i.e., H3/W3≥0.6). In embodiments, the aspect ratio of the third height H3 to the third width W3 may be 1.0 or greater, in particular up to 1.2. Thus, in embodiments, the aspect ratio of height H3 to width W3 is in the range of 0.6 to 1.2 (i.e., 0.6≤H3/W3≤1.2).

The frame 64 compress and retract the adhesive bead 66 with precision in a variety of suitable ways. According to a first embodiment, the frame 64 is positioned at the second height H2 and the third height H3 using the press 72. That is, the press 72 has sufficient precision to position the frame 64 so as to compress the adhesive bead 64 to the desired second height H2 and to retract the frame 64 to stretch the adhesive bead 64 to the desired third height H3. In another embodiment, the press 72 contacts a compliant stop 74. The pressure applied to the press 72 compresses the compliant stop 74 to a maximum degree of compression corresponding to the second height H2 of the adhesive bead 66. Thereafter, the pressure is released from the press 72, and the compliant stop 74 recovers to a level corresponding to the third height H3 of the adhesive bead 66. This latter embodiment has the advantage that the press 72 does not have to be as precise in positioning the frame 64. In these or other possible embodiments, the frame 64 is preferably able to be positioned relative to the glass sheet 52 so as to produce the desired heights H2, H3 of the adhesive beads 66 to a degree of precision of 100 μm.

In embodiments, the third height H3 is in the range of 0.5 mm to 2.0 mm, and the third width W3 is 2.0 mm or less. As mentioned above, the third height H3 of the adhesive bead 66 relates to the distribution of shear stress developed from the differential of thermal expansion between the frame 64 and glass sheet 52 during thermal cycling. Further, the overall size of the bead ensures adequate contact with the frame and glass sheet 52 to provide reliable adhesion without contaminating neighboring components or squeezing out of the sides of the glass article 50.

As can be seen in FIG. 4D, the final cross-sectional shape of the adhesive bead 66 may take on an hourglass shape in which the width at or near the center of the adhesive bead 66 is less than the width of the adhesive bead 66 in contact with the glass sheet 52 and with the frame 64. According to the present disclosure, the aspect ratio of the adhesive bead 66 is determined with respect to the widest width of the cross-section of the adhesive bead 66. In other embodiments, the final cross-sectional shape of the adhesive bead 66 is a rectangle or a bulging rectangle.

Figure 5A:
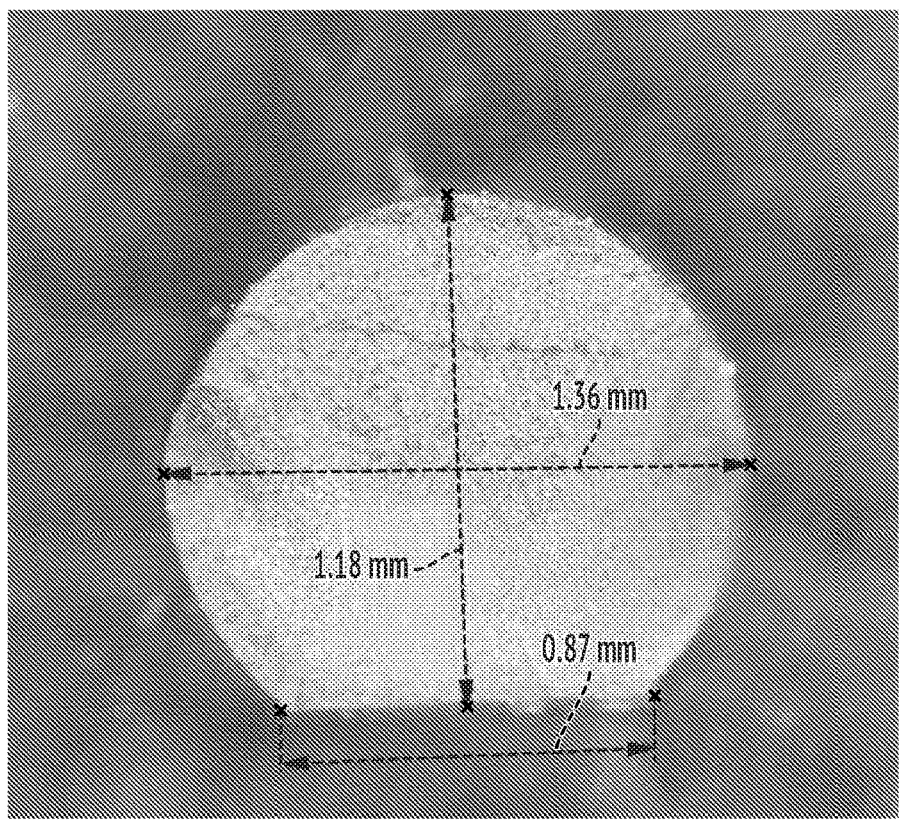
FIGS. 5A and 5B depict an uncompressed and compressed adhesive bead, respectively, according to exemplary embodiments.
Figure 5B:
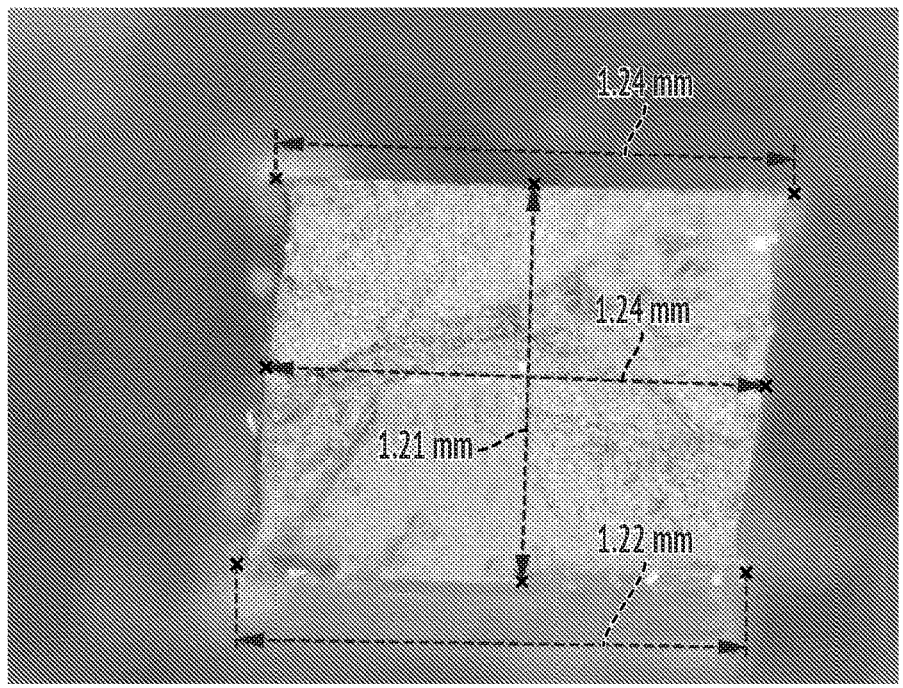

FIGS. 5A-5B depict cross-sectional views of adhesive beads 66 in the uncompressed state and in the final shape. In FIG. 5A, an uncompressed adhesive bead 66 deposited by a circular nozzle is shown. The adhesive bead 66 has a first height H1 of 1.18 mm and a first width W1 of 1.36 mm. As mentioned above, the region of contact between the adhesive bead 66 and glass sheet 52 produces a flat section, which accounts for the difference between the first height H1 and the first width W1, but the adhesive bead 66 is otherwise substantially circular. FIG. 5B depicts an adhesive bead 66 that was compressed from the first height H1 of about 1.18 mm as shown in FIG. 5A to a second height H2 of about 0.8 mm, and then the frame 64 was retracted to provide a third height H3 of about 0.93 mm. The third width W3 is about 1.2 mm, which provides an aspect ratio of about 0.78.

Advantageously, the higher aspect ratio adhesive bead 66 according to the present disclosure minimizes the area on the glass required for adhesive (thereby maximizing display size) while maintaining an acceptable bead thickness to distribute shear stresses resulting from thermal cycling. The disclosed method also ensures reliable adhesive contact between the glass sheet 52 and the frame 64.

Having described the glass article 50 having a high aspect ratio adhesive bead 66, discussion of the properties of embodiments of the glass sheet 52 are provided below. Thus, in the following paragraphs, various geometrical, mechanical, and strengthening properties of the glass sheet 52 as well as compositions of the glass sheet 52 are provided.

In various embodiments, the average thickness T of the glass sheet 52 between the first major surface 54 and the second major surface 56 is in the range of 0.3 mm to 2 mm. In various embodiments, the width of the glass sheet 52 is in a range from 5 cm to 250 cm. Further, in various embodiments, the length of the glass sheet 52 is in a range from 5 cm to 1500 cm. The length is the maximum dimension of the glass sheet 52 perpendicular to the thickness T. The width is the maximum dimension of the glass sheet 52 perpendicular to the thickness T and the length. In various embodiments, one or more radius of curvature (e.g., R shown in FIGS. 2A-2B) of glass sheet 52 is from 75 mm to 10,000 mm.

In one or more embodiments, glass sheet 52 may be strengthened to include compressive stress that extends from a surface to a depth of compression (DOC). The compressive stress regions are balanced by a central portion exhibiting a tensile stress. At the DOC, the stress crosses from a positive (compressive) stress to a negative (tensile) stress. In various embodiments, glass sheet 52 may be strengthened mechanically by utilizing a mismatch of the coefficient of thermal expansion between portions of the article to create a compressive stress region and a central region exhibiting a tensile stress. In some embodiments, the glass sheet may be strengthened thermally by heating the glass to a temperature above the glass transition point and then rapidly quenching.

In still other embodiments, the glass sheet 52 is chemically strengthened through an ion exchange process. In the ion exchange process, ions at or near the surface of the glass sheet are replaced by—or exchanged with—larger ions having the same valence or oxidation state. In those embodiments in which the glass sheet comprises an alkali aluminosilicate glass, ions in the surface layer of the article and the larger ions are monovalent alkali metal cations, such as $Li^+$, $Na^+$, $K^+$, $Rb^+$, and $Cs^+$. Alternatively, monovalent cations in the surface layer may be replaced with monovalent cations other than alkali metal cations, such as $Ag^+$ or the like. In such embodiments, the monovalent ions (or cations) exchanged into the glass sheet generate a stress.

Ion exchange processes are typically carried out by immersing a glass sheet in a molten salt bath (or two or more molten salt baths) containing the larger ions to be exchanged with the smaller ions in the glass sheet. It should be noted that aqueous salt baths may also be utilized. In addition, the composition of the bath(s) may include more than one type of larger ions (e.g., Na+ and K+) or a single larger ion. It will be appreciated by those skilled in the art that parameters for the ion exchange process, including, but not limited to, bath composition and temperature, immersion time, the number of immersions of the glass sheet in a salt bath (or baths), use of multiple salt baths, additional steps such as annealing, washing, and the like, are generally determined by the composition of the glass sheet (including the structure of the article and any crystalline phases present) and the desired DOC and compressive stress (CS) of the glass sheet that results from strengthening. Exemplary molten bath compositions may include nitrates, sulfates, and chlorides of the larger alkali metal ion. Typical nitrates include $KNO_3$, $NaNO_3$, $LiNO_3$, $NaSO_4$ and combinations thereof. The temperature of the molten salt bath typically is in a range from about 380° C. up to about 450° C., while immersion times range from about 15 minutes up to about 100 hours depending on glass sheet thickness, bath temperature and glass (or monovalent ion) diffusivity. However, temperatures and immersion times different from those described above may also be used.

In one or more embodiments, the glass sheets may be immersed in a molten salt bath of 100% $NaNO_3$, 100% $KNO_3$, or a combination of $NaNO_3$ and $KNO_3$ having a temperature from about 370° C. to about 480° C. In some embodiments, the glass sheet may be immersed in a molten mixed salt bath including from about 5% to about 90% $KNO_3$ and from about 10% to about 95% $NaNO_3$. In one or more embodiments, the glass sheet may be immersed in a second bath, after immersion in a first bath. The first and second baths may have different compositions and/or temperatures from one another. The immersion times in the first and second baths may vary. For example, immersion in the first bath may be longer than the immersion in the second bath.

In one or more embodiments, the glass sheet may be immersed in a molten, mixed salt bath including $NaNO_3$ and $KNO_3$ (e.g., 49%/51%, 50%/50%, 51%/49%) having a temperature less than about 420° C. (e.g., about 400° C. or about 380° C.). for less than about 5 hours, or even about 4 hours or less.

Ion exchange conditions can be tailored to provide a "spike" or to increase the slope of the stress profile at or near the surface of the resulting glass sheet. The spike may result in a greater surface CS value. This spike can be achieved by a single bath or multiple baths, with the bath(s) having a single composition or mixed composition, due to the unique properties of the glass compositions used in the glass sheets described herein.

In one or more embodiments, where more than one monovalent ion is exchanged into the glass sheet, the different monovalent ions may exchange to different depths within the glass sheet (and generate different magnitudes stresses within the glass sheet at different depths). The resulting relative depths of the stress-generating ions can be determined and cause different characteristics of the stress profile.

CS can be measured using those means known in the art, such as by surface stress meter (FSM) using commercially available instruments such as the FSM-6000, manufactured by Orihara Industrial Co., Ltd. (Japan). Surface stress measurements rely upon the accurate measurement of the stress optical coefficient (SOC), which is related to the birefringence of the glass. SOC in turn is measured by those methods that are known in the art, such as fiber and four point bend methods, both of which are described in ASTM standard C770-98 (2013), entitled "Standard Test Method for Measurement of Glass Stress-Optical Coefficient," the contents of which are incorporated herein by reference in their entirety, and a bulk cylinder method.

DOC may be measured by FSM or by a scattered light polariscope (SCALP) (such as the SCALP-04 scattered light polariscope available from Glasstress Ltd., located in Tallinn Estonia), depending on the strengthening method and conditions. When the glass sheet is chemically strengthened by an ion exchange treatment, FSM or SCALP may be used depending on which ion is exchanged into the glass sheet. Where the stress in the glass sheet is generated by exchanging potassium ions into the glass sheet, FSM is used to measure DOC. Where the stress is generated by exchanging sodium ions into the glass sheet, SCALP is used to measure DOC. Where the stress in the glass sheet is generated by exchanging both potassium and sodium ions into the glass, the DOC is measured by SCALP, since it is believed the exchange depth of sodium indicates the DOC and the exchange depth of potassium ions indicates a change in the magnitude of the compressive stress (but not the change in stress from compressive to tensile); the exchange depth of potassium ions in such glass sheets is measured by FSM. CT is the maximum tensile stress and is measured by SCALP.

Suitable glass compositions for use in glass sheet 52 include soda lime glass, aluminosilicate glass, borosilicate glass, boroaluminosilicate glass, alkali-containing aluminosilicate glass, alkali-containing borosilicate glass, and alkali-containing boroaluminosilicate glass.

In one or more embodiments, the glass composition may include $SiO_2$ in an amount in a range from about 66 mol % to about 80 mol %, $Al_2O_3$ in an amount in a range from about 4 mol % to about 15 mol %, $B_2O_3$ in an amount in a range from about 0 mol % to about 5 mol %, $P_2O_5$ in an amount in a range from about 0 mol % to about 2 mol %, $R_2O$ in an amount in a range from about 8 mol % to about 20 mol %, RO in an amount in a range of from about 0 mol % to about 2 mol %, $ZrO_2$ in an amount in a range of from about 0 mol % to about 0.2 mol %, and $SnO_2$ in an amount in a range from about 0 mol % to about 0.2 mol %. In the foregoing composition, $R_2O$ refers to the total amount of alkali metal oxides, such as $Li_2O$, $Na_2O$, $K_2O$, $Rb_2O$, and $Cs_2O$). In particular, $Na_2O$ may be present in an amount in a range from about from about 8 mol % to about 20 mol %, and $K_2O$ may be present in an amount in a range from about 0 mol % to about 4 mol %. Further, in the foregoing composition, RO refers to the total amount of alkaline earth metal oxide such, as CaO, MgO, BaO, ZnO and SrO. In particular, CaO may be present in an amount in a range of from about 0 mol % to about 1 mol %, and MgO may be present in an amount in a range of from about 0 mol % to about 7 mol %.

In embodiments, the glass composition may include other oxides of such metals as Ti, V, Cr, Mn, Fe, Co, Ni, Cu, Ce, W, and Mo. In particular, Fe in the form of $Fe_2O_3$ may be present in an amount in a range of from about 0 mol % to about 1 mol %, and $TiO_2$ may be present in an amount of in a range of about 0 mol % to about 5 mol %.

An exemplary glass composition includes $SiO_2$ in an amount in a range from about 65 mol % to about 75 mol %, $Al_2O_3$ in an amount in a range from about 8 mol % to about 14 mol %, $Na_2O$ in an amount in a range from about 12 mol % to about 17 mol %, $K_2O$ in an amount in a range of about 0 mol % to about 0.2 mol %, and MgO in an amount in a range from about 1.5 mol % to about 6 mol %. Optionally, $SnO_2$ may be included in the amounts otherwise disclosed herein.

Aspect (1) of this disclosure pertains to a glass article, comprising: a frame comprising a frame support surface; a glass sheet comprising a first major surface and a second major surface, the second major surface being opposite to the first major surface; an adhesive bead disposed between the frame support surface and the second major surface, the adhesive bead defining a bead path; wherein the adhesive bead has a cross-section perpendicular to the bead path, the cross-section comprising a width and a height; wherein the height is a maximum dimension perpendicular to the second major surface of the glass sheet and the width is a maximum dimension parallel to the second major surface of the glass sheet; wherein an aspect ratio of the height to the width is at least 0.6; and wherein the width is 2 mm or less.

Aspect (2) of this disclosure pertains to the glass article of Aspect (1), wherein the width is at least 0.5 mm.

Aspect (3) of this disclosure pertains to the glass article of Aspect (1) or Aspect (2), wherein the height is from 0.5 mm to 2 mm.

Aspect (4) of this disclosure pertains to the glass article of any one of Aspects (1) through (3), wherein the aspect ratio is at most 1.2.

Aspect (5) of this disclosure pertains to the glass article of any one of Aspects (1) through (4), wherein a cross-sectional area of the adhesive bead perpendicular to the bead path defines a bulging rectangle.

Aspect (6) of this disclosure pertains to the glass article of any one of Aspects (1) through (4), wherein a cross-sectional area of the adhesive bead perpendicular to the bead path defines a rectangle.

Aspect (7) of this disclosure pertains to the glass article of any one of Aspects (1) through (4), wherein a cross-sectional area of the adhesive bead perpendicular to the bead path defines an hourglass.

Aspect (8) of this disclosure pertains to the glass article of any one of Aspects (1) through (7), wherein the bead path is continuous between the frame support surface and the second major surface.

Aspect (9) of this disclosure pertains to the glass article of any one of Aspects (1) through (7), wherein the bead path is discontinuous between the frame support surface and the second major surface.

Aspect (10) of this disclosure pertains to the glass article of any one of Aspects (1) through (9), wherein the adhesive bead comprises a polyurethane.

Aspect (11) of this disclosure pertains to the glass article of any one of Aspects (1) through (10), wherein the adhesive bead comprises an elastic modulus in the cured state of 0.1 MPa to 300 MPa.

Aspect (12) of this disclosure pertains to the glass article of any one of Aspects (1) through (11), wherein the first major surface of the glass sheet comprises a curvature having a radius of curvature of 75 mm to 10 m.

Aspect (13) of this disclosure pertains to the glass article of any one of Aspects (1) through (12), wherein the first major surface and the second major surface of the glass sheet define a thickness of from 0.3 to 2.0 mm.

Aspect (14) of this disclosure pertains to a method of forming a glass article, the glass article comprising a glass sheet comprising a first major surface and a second major surface, the second major surface opposite to the first major surface, and a frame adhered to the glass sheet, the method comprising the steps of: applying an adhesive bead in a bead path onto the second major surface of a glass sheet or onto a frame support surface of the frame, the adhesive bead having a first height perpendicular to the second major surface or to the frame support surface to which the adhesive bead is applied and a first width in which the first width and the first height are perpendicular to the bead path; compressing the adhesive bead between the second major surface of the glass sheet and the frame support surface to a second height and a second width; and expanding the adhesive bead to a third height and a third width, wherein the third height is greater than the second height and wherein an aspect ratio of third height to the third width is at least 0.6.

Aspect (15) of this disclosure pertains to the method of Aspect (14), wherein the step of applying the adhesive bead comprises applying an adhesive bead having a substantially circular cross-section.

Aspect (16) of this disclosure pertains to the method of Aspect (14) or Aspect (15), wherein the second height is from 50% to 90% of the third height.

Aspect (17) of this disclosure pertains to the method of any one of Aspects (14) through (16), wherein the third width is from 0.5 mm to 2.0 mm.

Aspect (18) of this disclosure pertains to the method of any one of Aspects (14) through (17), wherein the third height is from 0.5 mm to 2 mm.

Aspect (19) of this disclosure pertains to the method of any one of Aspects (14) through (18), wherein the aspect ratio is at most 1.2.

Aspect (20) of this disclosure pertains to the method of any one of Aspects (14) through (19), wherein a cross-sectional area of the adhesive bead perpendicular to the bead path defines a rounded rectangle.

Aspect (21) of this disclosure pertains to the method of any one of Aspects (14) through (20), wherein a cross-sectional area of the adhesive bead perpendicular to the bead path defines a rectangle.

Aspect (22) of this disclosure pertains to the method of any one of Aspects (14) through (21), wherein a cross-sectional area of the adhesive bead perpendicular to the bead path defines an hourglass.

Aspect (23) of this disclosure pertains to the method of any one of Aspects (14) through (22), wherein the step of applying the adhesive bead further comprises applying the adhesive bead to the second major surface of the glass sheet when the glass sheet is in a flat configuration.

Aspect (24) of this disclosure pertains to the method of any one of Aspects (14) through (23), further comprising the step of cold-bending the first major surface of the glass sheet over a chuck.

Aspect (25) of this disclosure pertains to the method of any one of Aspects (14) through (24), wherein the frame is held by a press and wherein the step of compressing the adhesive bead further comprises the step of pressing the frame over the adhesive bead until the second height is reached.

Aspect (26) of this disclosure pertains to the method of Aspect (25), wherein the step of expanding the adhesive bead further comprises retracting the press until the third height is reached.

Aspect (27) of this disclosure pertains to the method of Aspect (26), wherein the press applies a first pressure to compress a compliant stop when the second height is reached.

Aspect (28) of this disclosure pertains to the method of Aspect (27), wherein the press decreases from the first pressure to a second pressure to reach the third height such that the compliant stop is no longer compressed.

Aspect (29) of this disclosure pertains to the method of Aspect (26), wherein the press automatically stops when the second height is reached and wherein, after retracting, the press holds the frame at the third height.

Aspect (30) of this disclosure pertains to the method of any one of Aspects (14) through (29), wherein the adhesive bead comprises an adhesive having a viscosity of 1 kcps to 500 kcps in an uncured state.

Aspect (31) of this disclosure pertains to a system for forming a glass article comprising a glass sheet adhered to a frame by an adhesive bead, the system comprising: a chuck comprising a curved forming surface over which the glass sheet is bent; a press configured to position the frame over the glass sheet; a nozzle configured to dispense the adhesive bead on the glass sheet; wherein the press is configured to position the frame at a first height above the glass sheet to compress the adhesive bead; wherein the press is configured to reposition the frame at a second height above the glass sheet, the second height being greater than the first height.

Aspect (32) of this disclosure pertains to the system of Aspect (31), wherein the nozzle has a circular port.

Aspect (33) of this disclosure pertains to the system of Aspect (31) or Aspect (32), wherein the press is configured to position the frame at the first height and at the second height to within a precision of 100 μm.

Aspect (34) of this disclosure pertains to the system of any one of Aspects (31) through (33), wherein the second height is 0.5 mm to 2.0 mm.

Aspect (35) of this disclosure pertains to the system of any one of Aspects (31) through (34), wherein the first height is from 50% to 90% of the second height.

Aspect (36) of this disclosure pertains to the system of any one of Aspects (31) through (35), further comprising a compliant stop, wherein the press compresses the compliant stop until the frame reaches the first height and wherein, after the frame reaches the first height, the press is released and the compliant stop recovers until the frame reaches the second height.

Aspect (37) of this disclosure pertains to the system of any one of Aspects (31) through (36), wherein the chuck comprises a plurality of vacuum channels terminating in a plurality of ports on the forming surface and wherein vacuum pressure can be drawn through the vacuum channels to hold the glass sheet against the forming surface.

Aspect (38) of this disclosure pertains to the system of any one of Aspects (31) through (37), wherein the forming surface comprises a radius of curvature of 75 mm or greater.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is in no way intended that any particular order be inferred. In addition, as used herein, the article "a" is intended to include one or more than one component or element, and is not intended to be construed as meaning only one.

It will be apparent to those skilled in the art that various modifications and variations can be made without departing from the spirit or scope of the disclosed embodiments. Since modifications, combinations, sub-combinations and variations of the disclosed embodiments incorporating the spirit and substance of the embodiments may occur to persons skilled in the art, the disclosed embodiments should be construed to include everything within the scope of the appended claims and their equivalents.

What is claimed is:

1. A glass article, comprising:
   a frame comprising a frame support surface;
   a glass sheet comprising a first major surface and a second major surface, the second major surface being opposite to the first major surface;
   an adhesive bead disposed between the frame support surface and the second major surface, the adhesive bead defining a bead path;
   wherein the adhesive bead has a cross-section perpendicular to the bead path, the cross-section comprising a width and a height;
   wherein the height is a maximum dimension perpendicular to the second major surface of the glass sheet and the width is a maximum dimension parallel to the second major surface of the glass sheet;
   wherein an aspect ratio of the height to the width is at least 0.6 and at most 1.2; and
   wherein the width is 2 mm or less.

2. The glass article of claim 1, wherein the width is at least 0.5 mm and wherein the height is from 0.5 mm to 2 mm.

3. The glass article of claim 1, wherein a cross-sectional area of the adhesive bead perpendicular to the bead path defines one of a bulging rectangle, a rectangle, and an hourglass.

4. The glass article of claim 1, wherein the bead path is continuous between the frame support surface and the second major surface.

5. The glass article of claim 1, wherein the bead path is discontinuous between the frame support surface and the second major surface.

* * * * *